United States Patent [19]
Payeur

[11] 3,783,725
[45] Jan. 8, 1974

[54] MECHANICAL SHEARS
[75] Inventor: Marcel Payeur, Plessisville, Quebec, Canada
[73] Assignee: Forano Limitee, Plessisville, Quebec, Canada
[22] Filed: Apr. 26, 1972
[21] Appl. No.: 247,666

[52] U.S. Cl. .................................. 83/326, 144/2 R
[51] Int. Cl. .......................... B26d 1/56, B27b 23/00
[58] Field of Search ...................... 83/326; 144/2 R, 144/2 Z, 2, 34 E

[56] References Cited
UNITED STATES PATENTS

| 1,216,936 | 2/1917 | Brach | 83/326 |
|---|---|---|---|
| 1,530,318 | 3/1925 | Oszman | 83/326 |
| 1,667,763 | 5/1928 | Armstrong | 83/326 |
| 1,093,380 | 4/1914 | Brach | 83/326 |
| 2,986,796 | 6/1961 | Mazzoni | 83/326 |

Primary Examiner—Frank T. Yost
Attorney—Roger Goudreau

[57] ABSTRACT

The invention is in mechanical shears for slashing tree stems into logs. It is formed of a pair of conveyor assemblies including endless tracks of which the forward portions are mounted so as to face one another and be inclined toward one another whereby to define therebetween a tapering passage along which the stems to be slashed are moved; the wide end of the passage being the inlet end and the narrow one, the outlet end. The tracks have, mounted thereon, an equal number of shear blocks spaced from one another a distance equal to the length of logs desired, the shear blocks each having a shear blade projecting laterally outwardly of the respective track. The blocks are so located along the tracks that the cutting edge of a shearing blade of one block edgedly faces the cutting edge of a shearing blade of a block on the other conveyor track when the blocks ride along the track forward portions. Because the latter are inclined toward one another, the blades move toward one another and thus shear any tree stem fed into the tapering passage.

18 Claims, 14 Drawing Figures

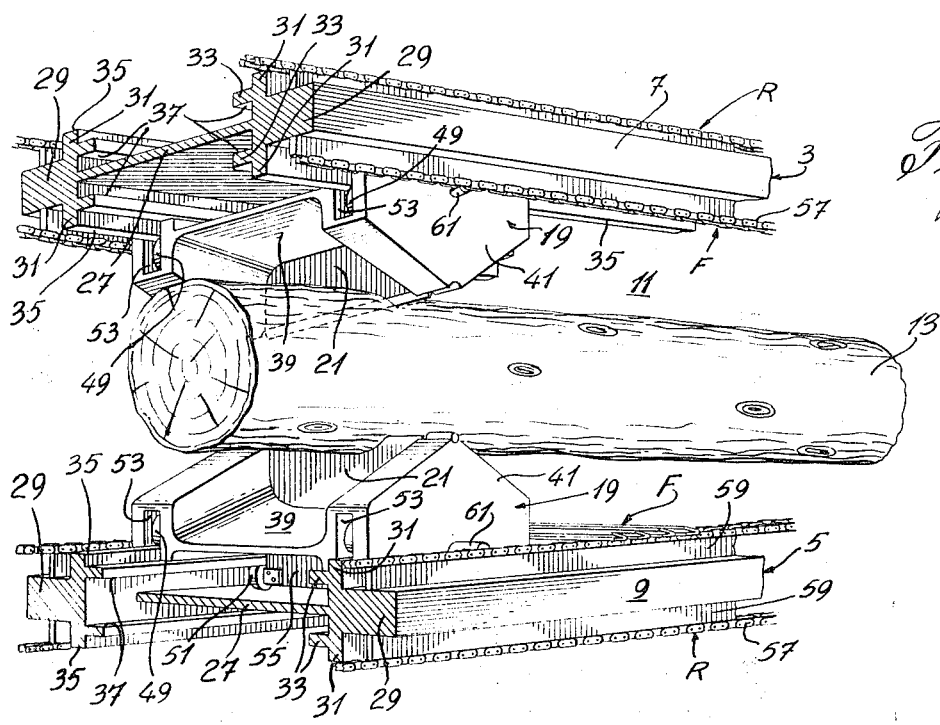
Fig. 2
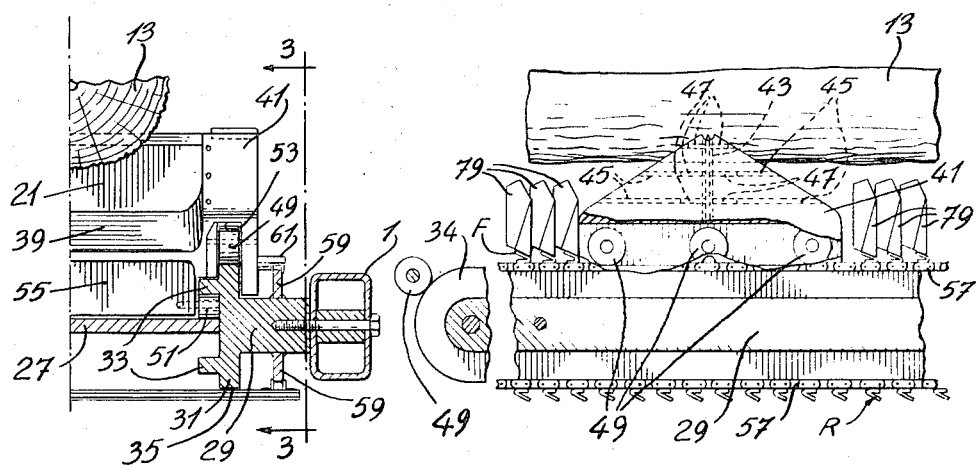
Fig. 7
Fig. 3

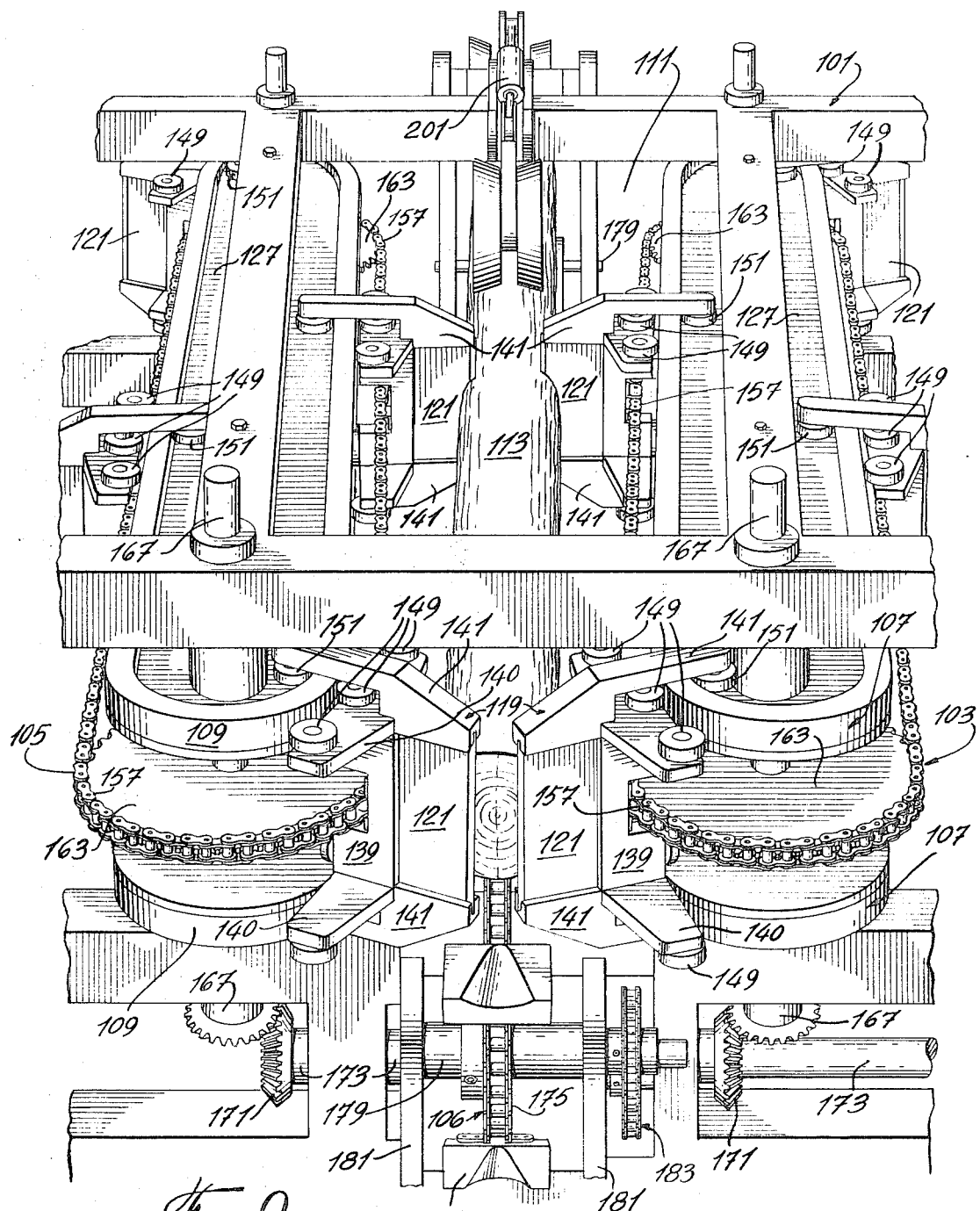

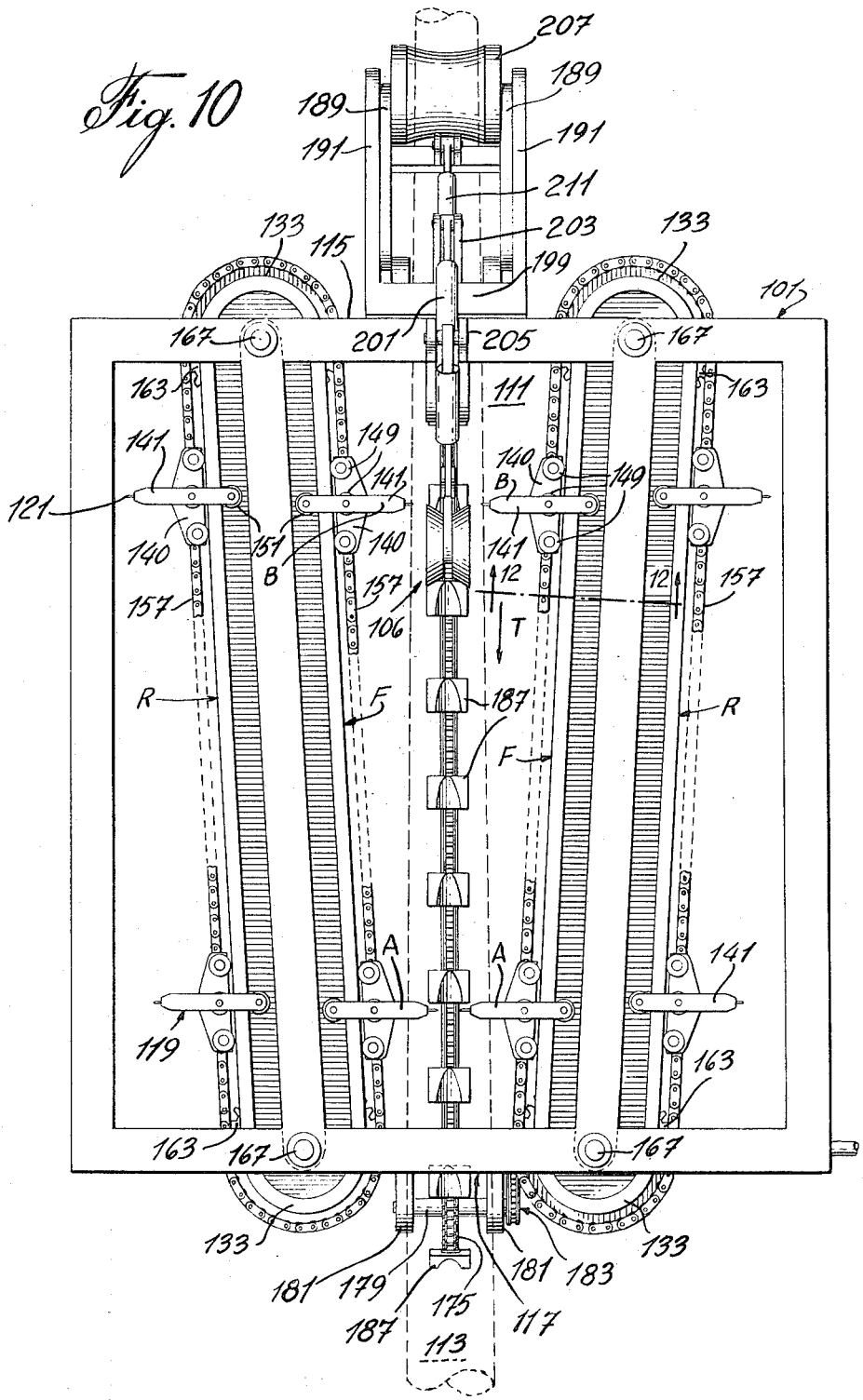

MECHANICAL SHEARS

The present invention relates to a tree slasher in the form of mechanical shears for sectioning delimbed trees into logs of a predetermined length.

In conventional slashers, the tree stems are brought to a sawing station by a conveyor and are slashed by means of a rotary saw or of a chain saw mounted at the end of a swinging arm movable from an inoperative position standing laterally away from the tree stems, into an operative swaying motion across the stems during which the latter are sawed. After the operation is completed, and before the rest of the tree stems can be moved into sawing position, the swinging arm has to come to a complete stop and operated in reverse swinging motion to return it to its inoperative position. Thus, valuable production time is wasted between each cut. This waste of time is further increased by the fact that the swinging arm is usually operated by a hydraulic ram of which the operation is rather sluggish and slow when starting up as well as during reversing motion to return the swinging arm to inoperative position.

It is therefore an object of the present invention appreciably to increase the production of the logs by eliminating the time wasted between each cut of the tree stems. I have found that this is possible with the mechanical shears of my invention which are designed so that the slashing operation can be carried out uninterruptedly until the entire tree stems are sectioned into logs. Thus, with the machine of my invention, no time is wasted for the withdrawal of the slashing tool after each cut.

More specifically, the mechanical shears of my invention are formed of a pair of conveyor assemblies including endless tracks defining forward and return portions, the forward portions being mounted so as to face one another and be inclined toward one another whereby to define a tapering passage along which the stems to be slashed are moved; the wide end of the passage being the inlet end and the narrow one, the outlet end. The tracks have, mounted thereon, an equal number of shear blocks spaced from one another a distance equal to the length of logs desired, the shear blocks each having a shear blade projecting laterally outwardly of the respective track. The blocks are so located along the tracks that the cutting edge of a shearing blade of one block on one track edgedly faces the cutting edge of a shearing blade of a block on the other track when the blocks ride along the track forward portions. Because the latter are inclined toward one another, the blades move toward one another and thus shear any tree stem fed into the tapering passage.

Further details and other objects and features of the invention will be given or will become apparent from the description that follows of preferred embodiments, having reference to the appended drawing wherein:

FIG. 2 is a perspective view, on an enlarge scale, of a portion of opposing forward conveyor tracks intended to illustrate the principle applied;

FIG. 3 is a side elevation view, partly in cross-section, of a portion of a lower forward run taken along line 3—3 of FIG. 7;

FIG. 6 (first sheet) is a vertical cross-sectional view at the inlet end of the shears;

FIG. 7 (second sheet) is a cross-sectional partial view of one side of a lower conveyor assembly;

FIG. 9 is a further perspective view on a larger scale of the second embodiment with the frame partly removed;

FIG. 10 is a top plan view;

Figure 1:
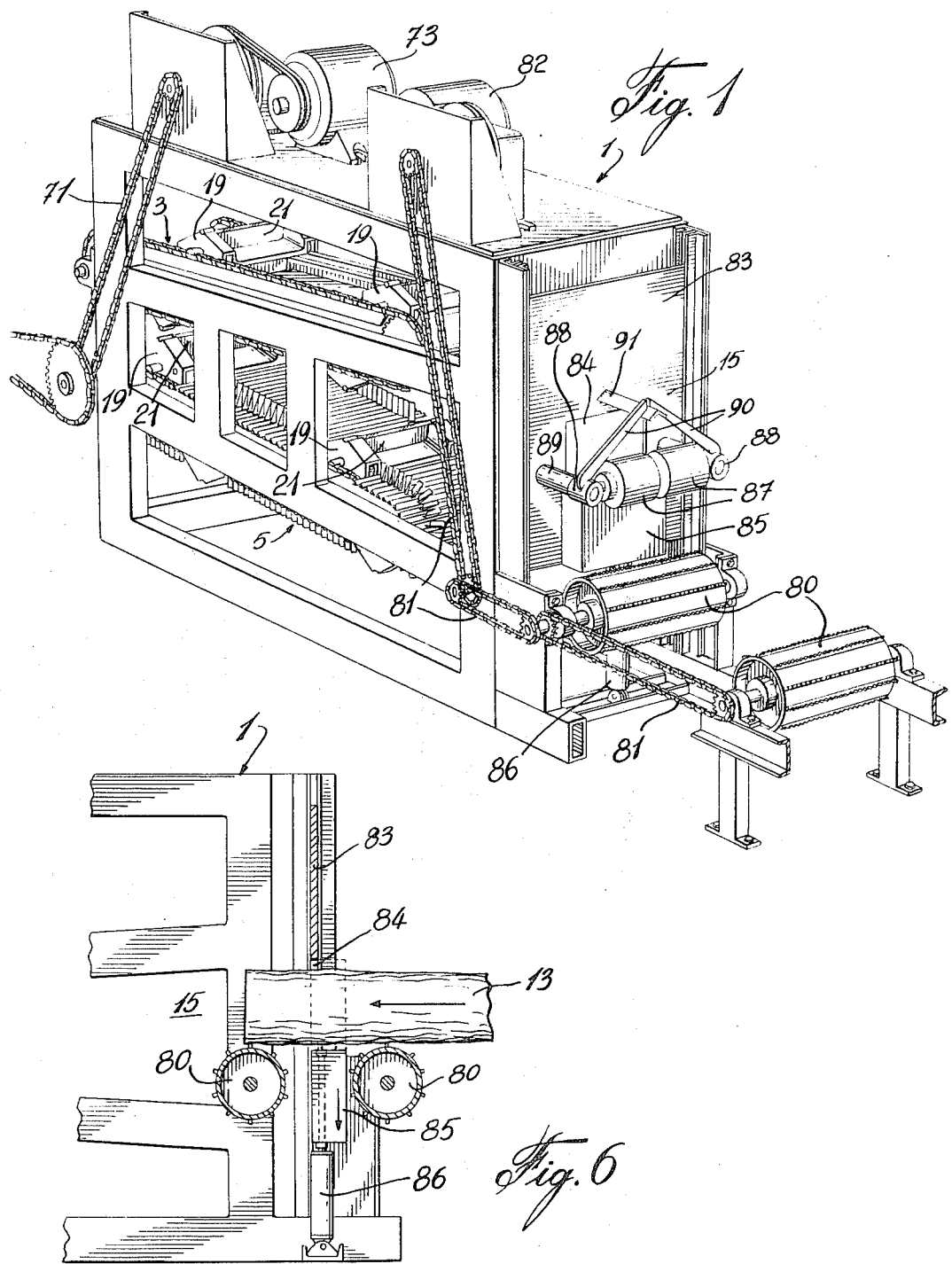
FIG. 1 is a perspective view of mechanical shears of the horizontal type made according to the invention.
Figure 4:
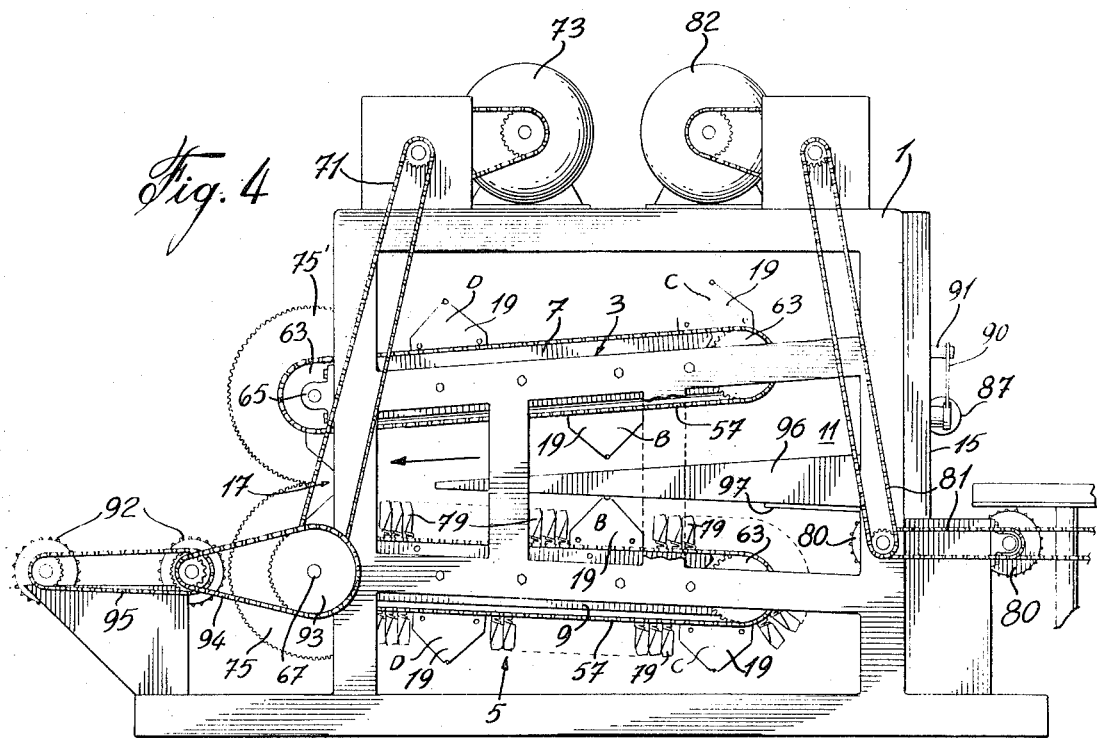
FIG. 4 is a side elevation view of the embodiment of FIG. 1.
Figure 5:
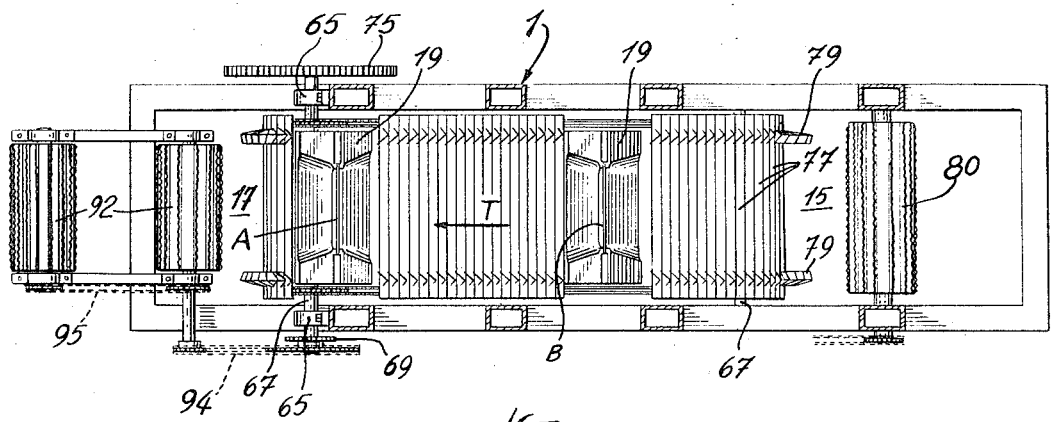
FIG. 5 is a plan view taken from immediately above the lower conveyor assembly.
Figure 8:
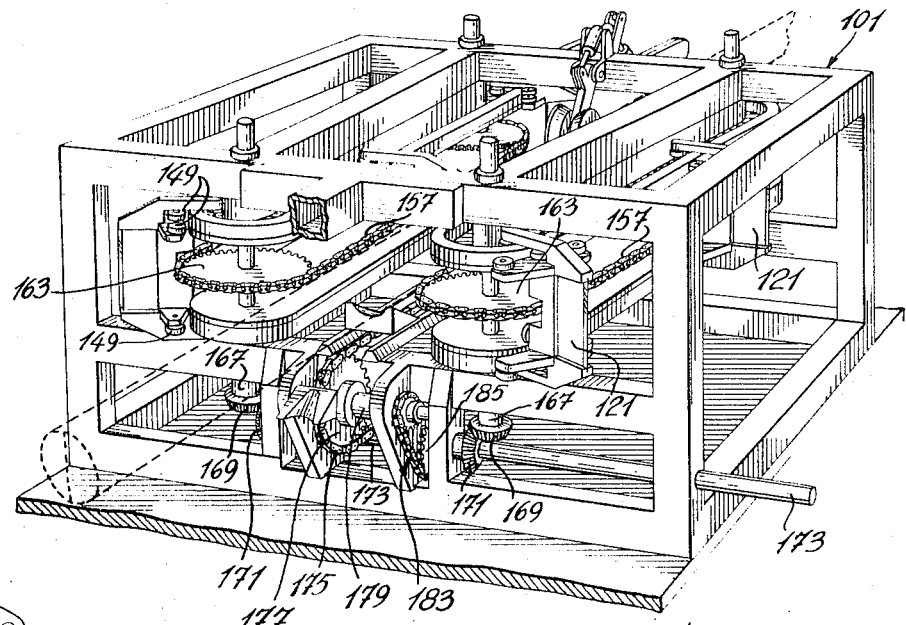
FIG. 8 is a perspective view of mechanical shears of the vertical type made according to a second embodiment of the invention.
Figure 11:
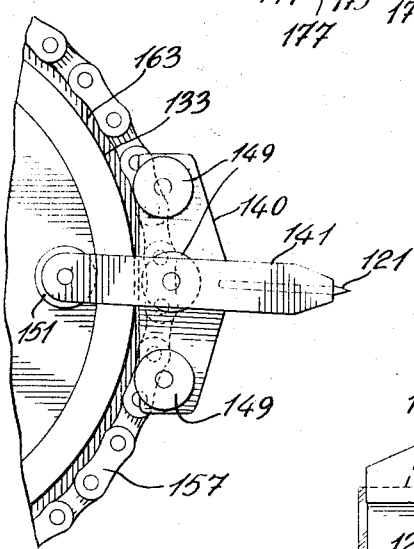
FIG. 11 (fourth sheet) is a top plan view, on an enlarged scale, of a portion of a conveyor track rounding a bend and illustrating a shear block and blade on the track.

Referring now to the first embodiment illustrated in FIGS. 1–7, the mechanical shears are of the horizontal type, that is, the cutting edges of the shear blades are horizontal. The shears comprise a frame 1 in the form of a rectangular box within which are mounted two conveyor assemblies, a top one 3 and a bottom one 5, respectively, having endless tracks 7 and 9 each defining a forward and a return portion or run along their opposed edges. As best illustrated in FIG. 4, the tracks 7 and 9 are disposed so that their forward portions or runs face one another and are inclined longitudinally toward one another whereby to define a tapering passage 11 along which the stems 13 to be slashed are moved lengthwise; the wide end of the passage 11 being the inlet end 15 and the narrow end being the outlet end 17.

The conveyor assemblies 3 and 5 have an equal number of shear blocks, or shear blade mounting blocks 19, in the form of carriers mounted on the tracks 7 and 9 and spaced from one another a distance equal to the length of logs described, the shear blocks each having a shear blade 21 projecting laterally outwardly of the respective track. It will also be noted, particularly from FIG. 4, that the blocks 19 are so located along the tracks 7, 9, that the cutting edge of a shearing blade of a block on one track edgedly faces the cutting edge of a shearing blade of a block on the other track when the blocks ride along the forward portions or runs. As will easily be gathered, because the track forward portions or runs are inclined toward one another, the paired blades 21 move toward one another causing shearing of any tree stems fed into the tapering passage.

Obviously means, to be further described hereinafter, must be provided to drive the shear blocks 19 at the same speed and in the same direction. Obviously also, the vertical distance between the cutting edges of paired shearing blades 21 must be such as to stand away from the tree stems to be slashed, when at the inlet end 15. It must also be such as to allow the blades gradually to bite deeper and deeper into the stems when the latter move forward toward the outlet end 17. Finally, the distance must be such at the outlet end that the blades completely shear the stems when reaching the said outlet end.

Each track 7 and 9 is formed of a central flat web 27 joining a pair of parallel side members 29 running along its lateral edges. Each side member is formed, in turn, with a rail 31 extending in an endless path having a forward run F and a return run R joined at the ends by half circular portions 34 (FIG. 3), all defining an endless front riding surface 35. The rails 31 also comprise inwardly projecting parallel ledges 33 joined at the ends by half circular ledge portions (not shown) to provide an endless rear riding surface 37.

Each block 19 is formed of a shallow central base 39, slightly inclined upwardly from both ends toward the transverse center line. Base 39 has formed integral therewith, a pair of generally triangular blade supports 41 upstanding from either side, the supports and the base having a continuous groove 43 (FIG. 3) into which the blade 21 is received and secured. Since the blocks 19 ride on rails 31 that are not parallel, the grooves 43 should be made wider than the thickness of the blades and the latter adjusted therein so that the blades of opposing blocks lie substantially in the same vertical plane. This may be obtained by providing a series of tapped holes 45 through the blade supports 41 into which set screws 47 are driven to secure the blades 21 in proper position which would be slightly inclined with respect to the riding surfaces 35, 37.

The blocks 19 are made displaceable on the rails 31 of the tracks 7, 9 by means of front and rear riding wheels or rollers 49, 51, respectively. The front wheels 49 are rotatably mounted in channels 53 formed at the bottom of each blade support 41, there being three wheels 49 in each channel 53 riding over the front riding surface 35. The rear wheels 51 are mounted on axles extending laterally from central plates 55 (FIGS. 2 and 7) depending downwardly from the bases 39 of the blocks and generally immediately below the blades 21, there being only a single pair of rear wheels 51 per block, one on either side thereof, to allow easy winding around the circular end portions 34 of the tracks 7, 9. The rear wheels 51 ride over the rear riding surfaces 37 and serve to hold the blocks when the latter ride on the lower ones of the rear riding surfaces 37.

The blocks 19 are brought into motion by endless chains 57 mounted on either side of the blocks, outwardly thereof, and supported on flanges 59 (FIGS. 1 and 7) upstanding from the side members 29. The blocks 19 are connected, in any known manner, to the chains 57, such as by means of short lugs 61 projecting laterally from the blade supports 41. As mentioned previously, the blocks are distributed along the chains so as to be spaced at intervals equal to the length of logs desired.

As best shown in FIG. 4, the endless chains 57 wind, at the ends, around sprocket wheels 63 rotatably mounted on the frame 1, the rearward ones corresponding to the outlet end 17 of the passage 11 being mounted through the medium of bearings 65. One shaft 67 on which the rear sprocket wheels 63 of the lower conveyor assembly 5 are mounted (FIG. 5) has an additional sprocket wheel 69 for a driving chain 71 coupled to a driving motor 73 in any known manner. The top conveyor assembly 3 is connected to the lower one 5 by a pair of meshing gears 75, 75' mounted on their corresponding axles 67. The parts of the driving assembly are selected in size such as to ensure that the block driving chains 57, and consequently the blocks 19, are driven at equal speed and in the direction T when in the passage 11. Also, and as mentioned previously, the spatial relationship of the blocks on the two assemblies 3 and 5 is such that, when riding along the forward run of the tracks 31, the blade 21 of a block on one track stands with its cutting edge immediately opposite the cutting edge of a blade of a block on the other conveyor track.

The chains 57 of the bottom conveyor assembly 5 are interconnected, between the blocks 19, by a succession of closely disposed slats 77 having a triangular cross-section and intended to serve as a chip-retaining bed whereby the chips may be collected at the outlet end 17 of the passage 11. It may also serve to hold the overhanging end of a tree stem when first pushed into passage 11, as will be easily gathered from inspection of FIG. 4.

Metal guard members 79 (FIGS. 4 and 5) may also be provided along either side of the slat bed to upstand therefrom and prevent tree stems from falling off the conveyor formed by the chains 57 and the slats 77. For sturdiness, the guard members 79 may also have a triangular cross-section.

The tree stems are brought into the passage 11 by a conveyor of any conventional type such as that particularly illustrated by the friction rollers 80 of the teeth gripping type brought into rotation by a chain drive 81 connected to a motor 82 and operable independently of the conveyor assemblies 3 and 5. For proper control of the slashing operation, as will be fully described hereinbelow, the inlet end 15 of the frame 1 has an inlet wall 83 provided with an opening 84 controlled by a vertical movable gate 85 operable by a hydraulic ram 86 connected at one end to the base of the frame 1 and, at the other end, to the lower edge of the gate 85. Above the gate is a pressure applying device intended to bear against the incoming tree stems to hold them against the conveyor 80. The device comprises a pair of rollers 87 freely rotatable about their own longitudinal axis and of which the axles are secured at one end to spring loaded sleeves 88 biasing the rollers 87 downwardly toward the horizontal position shown in FIG. 1. The sleeves 88 are mounted for free rotation on short stubs 89 projecting from the inlet wall 83. Arms 90, secured to the sleeves 88, project laterally therefrom to abut a stop number 91, also secured to wall 83, to prevent downward movement of the rollers 87 past the horizontal position of FIG. 1. Thus, whenever a tree stem is moved to abut the gate 85, the rollers 87 are rotated upward and are made to press on the stem by the counter-action of the biassing sleeves 88.

Discharge of the logs obtained from the slashed tree stems is by means of a further conveyor such as that illustrated by the outlet friction rollers 92 (FIG. 5) that may also be of the teeth gripping type. Rollers 92 are rotated in synchronism and at the same peripheral speed as that of the conveyor assemblies 3 and 5 by means of a sprocket wheel 93 mounted on the shaft 67 and by the chain drives 94 and 95.

In order properly to feed the tree stems in passage 11, a pair of triangular guard plates 96 may be secured to the frame 1 and provided on either side of passage 11 at the inlet end 15; the plates 96 having a horizontal ramp 97 to guide the tree stems along.

In operation, the tree stem or stems (there may be more than one, lying side by side) are driven by the inlet friction rollers 80 against the inlet gate 85 which then is in the closing position of the opening 84. At that time, the conveyor assemblies 3 and 5 are inoperative and idle and the blades A and B are in the position shown with the cutting edges of the blades A of both conveyor assemblies substantially touching one another as is the case at the end of a slashing cycle. In that position, the blades B are disposed sufficiently far apart that the tree stems may move therebetween. The gate 85 is then lowered, by the operator, to clear the opening 84 (FIG. 6) and the stems are allowed in the passage 11 and pushed between the blades B until their aligned ends reach and abut the forward blades A, having dropped slightly in view of the upward inclination of the lower conveyor assembly 5. At that moment, the operator starts the two conveyors and the tree stems are completely slashed into logs, being automatically fed by the gripping action of the block blades A, B, C, and D, running continuously. Starting and stopping of the conveyor assemblies 3 and 5 may be made automatically, in any known manner, as suggested hereinbelow with respect to the description of the second embodiment. To ensure maximum efficiency, the assemblies 3 and 5 are stopped in the position of the blocks A and B of FIG. 5, as defined above.

Thus, a tree slasher has been provided which is capable of cutting tree stems into logs in an absolutely continuous manner no production time being wasted, between cuts, to remove slashing tools as is now necessary with known slashers.

Referring now to FIGS. 8 through 14, illustrating a second embodiment of the invention, it will be seen that in this case the conveyor assemblies 103 and 105 (FIG. 9) are mounted on the frame 101 so that the cutting edge of the shear blades 121 stand vertical. The shears of this embodiment require a further conveyor assembly 106 lying horizontal and at the bottom of the passage 111.

Assemblies 103 and 105 respectively have endless tracks 107 and 109 that define each a forward portion or run F and a return portion or run R. Again, the tracks 107 and 109 are disposed so that their forward runs F face one another and are inclined longitudinally toward one another whereby to define the aforesaid passage 111 which is taper and has a wide inlet end 115 and a narrow outlet end 117. Also, the spatial relationship of the shear blocks 119 of the two assemblies is the same as that of the like elements of the first embodiment whereby to produce shearing of the tree stems 113 in the same manner.

Figure 12:
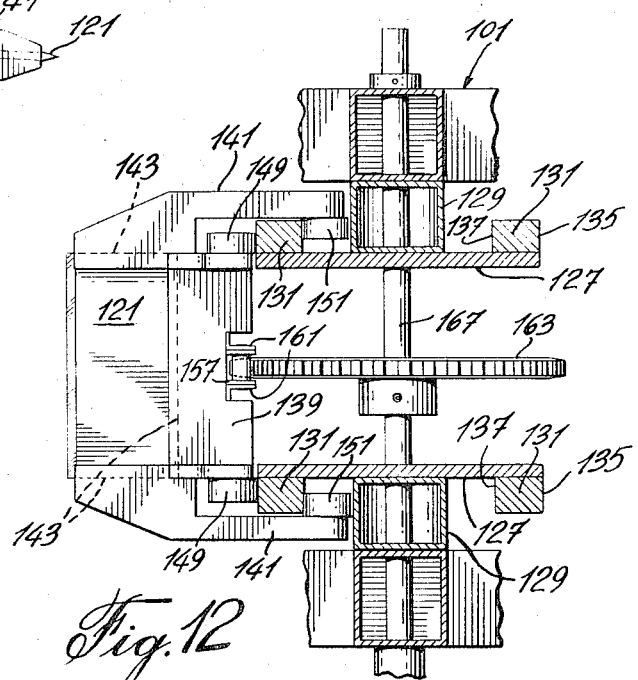
FIG. 12 (fourth sheet) is a vertical cross-sectional partial view, at one end of one conveyor assembly, taken along line 12—12 of FIG. 10.

Each track 107, 109 is formed of a pair of vertically spaced parallel webs 127 (FIG. 12) secured, as by welding, to hollow beams 129 themselves fast with the frame 101. To each of the webs 127, and facing outwardly along the edges thereof, rails 131 are fastened, each extending in an endless path having a forward and a return run corresponding to the aforementioned track runs F and R and joined by half circular winding stretches 133 (FIG. 10). Rails 131 define, on opposite faces, front and rear riding surfaces 135, 137 (FIG. 12).

The shear blocks 119 are of a construction generally similar to the blocks 19 of the first embodiment and to provide the same function which is that of a carrier for the blades 121. Each is formed of a central transverse strut 139 interconnecting a pair of parallel axles 140 to which are secured upwardly extending blade supporting arms 141, the arms and strut having a continuous groove 143 (FIG. 12) for the securing of the blade 121.

As in the first embodiment, provision may be made to adjust the blades 121 in the grooves 143 so that blades of blocks facing one another when along the forward runs F lie generally in the same plane despite the inclination of the tracks 107, 109.

The blocks 119 are displaced on the rails 131 of the tracks 107, 109 by front and rear riding rollers 149, 151, respectively. The front rollers 149 are mounted for rotation on the axles 140, there being three rollers per axle. The rear rollers 151 are mounted for rotation at the ends of the arms 141, there being a single rear roller 151 per arm 141 riding on the rear surface 137 to thus allow easy winding around the circular bends or stretches 133. As in the first embodiment, the arrangement is such as to hold the blocks 119 safely against the tracks 107, 109.

The blocks 119 of each conveyor assembly 103, 105, are brought into motion by a single endless chain 157, each block being secured to one link of the chains to which it belongs by means of angle brackets 161 fast with the corresponding strut 139, as best illustrated in FIG. 12. It has been mentioned above that the blocks 119 are distributed along the chains 157 so as to be spaced at intervals equal to the length of logs desired.

The chains 157 wind, at the ends, around sprocket wheels 163 mounted fast on shafts 167 journaled on the frame 101. The lower ends of shafts 167 have bevelled gears 169 in mesh with like bevelled gears 171 mounted on a driving shaft 173 journaled on the frame 101 and coupled to a motor assembly (not shown). The parts of the driving assemblies are selected in size, as previously for the first embodiment described, such as to ensure that the chains 157 and consequently the blocks 119 are driven at equal speeds and in the direction T (FIG. 10) when in the passage 111.

The third conveyor assembly 106 is formed of an endless chain 175 that winds, at the ends, around sprocket wheels 177 fixed to shafts 179 journaled on bearing plates 181 of the frame 101. The chain 175 and sprocket wheels 177 are brought into rotation by a chain drive generically identified by numeral 183 (FIGS. 8 and 9) and including a sprocket wheel 185 mounted fast on the driving shaft 173 to be driven thereby. By properly selectioning the size of the parts of this assembly 106, the chain 175 is made to travel at the same speed as chains 157 of the conveyor assemblies 103, 105.

Evenly distributed along the chain 175 is a series of stem driving members 187 having, in cross-section, the shape of a right angle triangle (FIG. 13) with the trailing hypothenuse and a sharp top apex intended to grip the stems to drive them along the passage 111. To help in this motion, the hypothenuse face may be made slightly concave, as shown. This concave shape serves also to help slide the stem in the passage 111 when the chain 175 is idle.

Figure 13:
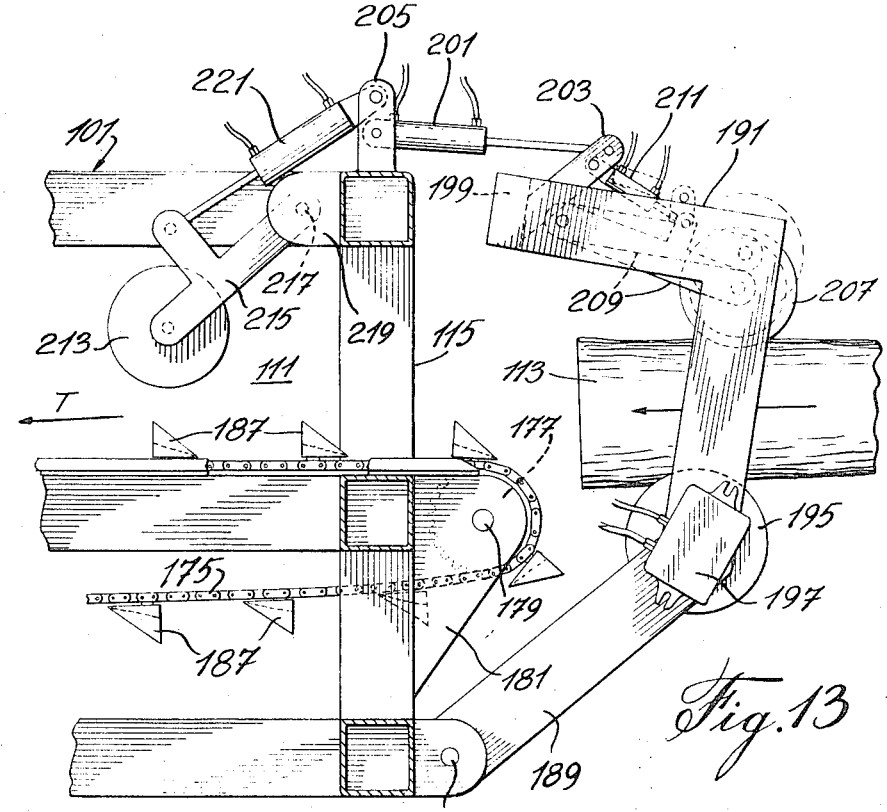
FIGS. 13 and 14 are side elevation partial views taken at the inlet end of the shears intended to illustrate the guiding and driving means for the tree stems.
Figure 14:
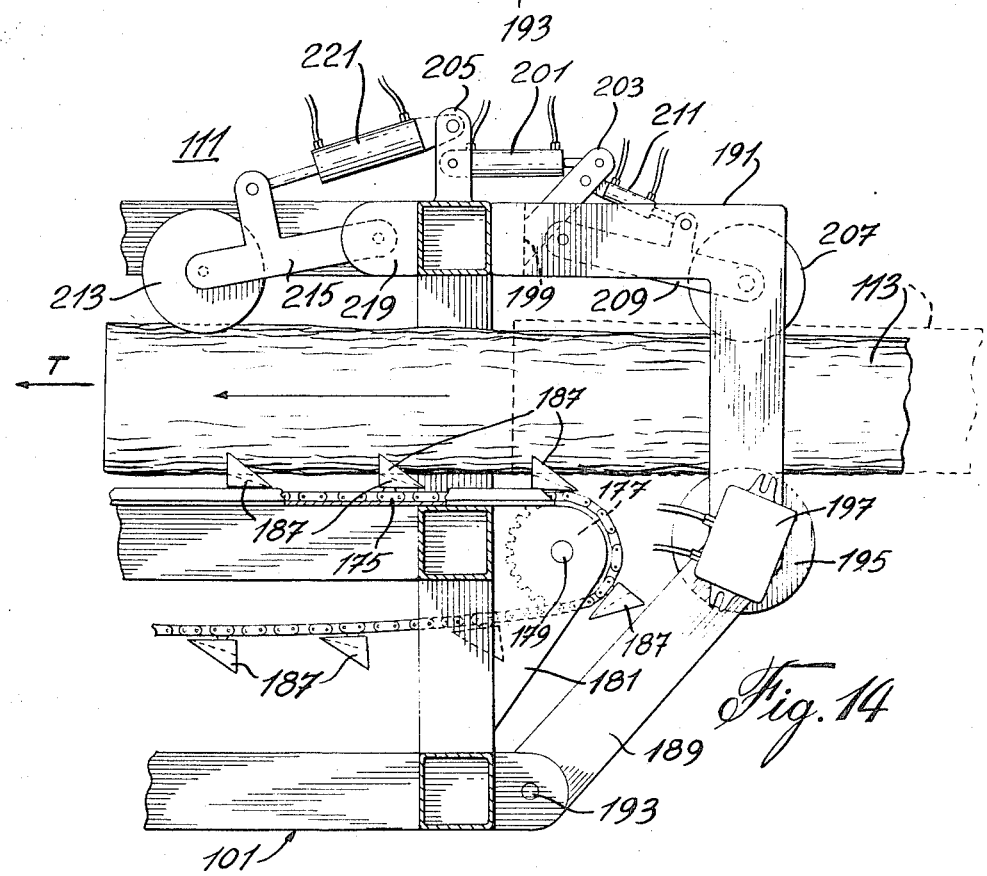

FIGS. 13 and 14 particularly illustrate a device mounted at the inlet end 115 of the shears to guide and drive the tree stems in the passage 111. It is made up of a pair of lower levers 189, each on one side of the inlet end opening, and a pair of upper levers 191, each also on one side of the inlet end opening. The lower levers 189 are pivotally connected at one end, as at 193, to the lower portion of the frame 101 while a roller 195 interconnects the other ends, the said roller being motorized into rotation by a motor, preferably a hydraulic motor 197, and being of the friction type so that when applied against a stem 113, it can drive it forward into passage 111.

The upper levers 191 are, in turn, pivotally connected at one end to the roller end of the lower levers 189. They are L-shaped when viewed sideways and the ends opposite the pivoted ends are joined by a bridge member 199.

A first extensible power means such as a hydraulic ram 201, is pivotally connected through its rod to a fork 203 upwardly projecting from the bridge member 197 while its cylinder end is pivotally connected to a bracket 205 upstanding from the top of the frame 101.

The tree stem 113 is pressed against the friction motorized roller 195 by a freely rotatable roller 207 mounted at the ends of a pair of arms 209, the other ends of which are pivoted to the levers 191, inwardly thereof. Pressure is applied on the roller 207 by a hydraulic ram 211 connected to the arms 209 and to the fork 203, respectively.

As will be gathered from the above description, a tree stem 113 is driven on the friction roller 195 by the inlet conveyor (not shown), the operator brings the pressure roller 207 down against it by extension of the hydraulic ram 211 and then contracts the hydraulic ram 201 to bring the ridge member 199 of the levers 191 against the frame 101, reaching the position shown in FIG. 14. At that moment, the motor 197 is energized to bring the friction roller 195 into rotation and forces the stem 113 inside the frame 101 and into the passage 111.

A further pressure roller 213 at the ends of arms 215 pivoted, as at 217, to a forked bracket 219 of the frame 101 and actuated by a hydraulic ram 221, may also be provided in the passage 111 inside the frame 101 to press the tree stem against the third conveyor chain 175.

The operation of the mechanical shears of this embodiment is the same as that of the first embodiment and can be carried out either manually, in the manner explained with respect to the said first embodiment, or automatically in a manner that will readily come to those skilled in this art, to produce the same functions.

I claim:

1. Mechanical shears for slashing tree stems into logs of a predetermined length, said shears comprising:
    a. a pair of conveyor assemblies, each assembly comprising:
        an endless tract including a forward portion, a return portion and end portions, all defining endless riding surfaces;
        an equal number of shear blocks mounted on said endless track to be displaced therealong; said blocks each having a shearing blade projecting laterally outwardly with respect to said track and each having roller means for sliding travel on said riding surfaces of said encless track; an endless driving conveyor connected to said blocks to drive them along said track, said shear blocks and blades being spaced from one another along said conveyor a distance equal to said predetermined length;
    b. means mounting said conveyor assemblies so that the forward portions of said endless tracks face one another and are inclined longitudinally toward one another to define a tapering passage for the lengthwise movement of the stems to be slashed, the wide end of said passage being the inlet end for said stems;
    c. means driving both said conveyors at equal speed and in the same direction;
    d. said shear blocks being disposed in such spatial relationship along said tracks that the shearing blade of a block of one conveyor stands with the cutting edge thereof opposite and facing the cutting edge of the shearing blade of a block of the other conveyor when said shear blocks are on said track forward portions, and
    e. said blades projecting laterally from said tracks a distance such as to be free of a tree stem to be slashed when said blades are at said passage inlet end, to gradually bite deeper and deeper into said stem while moving forward toward said outlet end, and to completely shear said stem when reaching said outlet end.

2. Mechanical shears as claimed in claim 1 wherein each track comprises two parallel guiding rails each extending in an endless path and defining opposed parallel front and rear riding surfaces extending longitudinally with respect to said passage, and wherein each roller means comprises front and rear riding wheels bearing on said front and rear riding surfaces and holding said blocks against said rails.

3. Mechanical shears as claimed in claim 2 wherein one of said tracks stands above the other with the cutting edges of said blades extending horizontally transversally of said passage.

4. Mechanical shears as claimed in claim 3 wherein each driving conveyor comprises a pair of endless driving chains located laterally outwardly of said blocks, and means connecting said chains to said blocks to drive them along said endless path of said guiding rails.

5. Mechanical shears as claimed in claim 4 including metal cross slats, between the successive blocks of the bottom one of said conveyor assemblies, interconnecting the corresponding chains to form a chip-retaining bed for said bottom conveyor assembly.

6. Mechanical shears as claimed in claim 5 comprising metal guard members upstanding from said slats along the side edges thereof to prevent tree stems from falling off said bottom conveyor assembly.

7. Mechanical shears as claimed in claim 4 wherein each block is formed of a shallow central base and of a pair of blade supports upstanding from said base laterally thereof, said supports and base having grooves thereon forming a continuous channel; said blades being received and secured in said channels.

8. Mechanical shears as claimed in claim 7 including means in said blade supports to adjust the position of said blades on said blocks so that blades of opposing blocks on said conveyor tracks lie substantially in the same plane.

9. Mechanical shears as claimed in claim 6 wherein said means mounting said conveyor assemblies is a frame; guiding plates fixed to said frame and extending from said inlet end into said passage and generally above said guard members of said bottom conveyor assembly.

10. Mechanical shears as claimed in claim 4 wherein said means supporting said conveyor assemblies is a frame, said shears including a feeding travelling conveyor outside of said frame to carry the stems to be slashed into said passage, said frame comprising a gate across said feeding conveyor at the inlet end of said passage for the abutment of the stems to cause alignment thereof prior to their entering into said passage, and means to move said gate away from said additional conveyor to allow entry of the stems into said passage.

11. Mechanical shears as claimed in claim 2 wherein said tracks stand one next to the other and there is provided, between said assemblies and at the bottom of said passage, a third endless conveyor having a horizontal top run to carry, through said passage, the tree stems to be slashed.

12. Mechanical shears as claimed in claim 11 comprising means driving said three conveyors at equal speed and in the same direction.

13. Mechanical shears as claimed in claim 12 wherein each of said first two conveyors comprises a single driving chain located centrally of said blocks and means connecting said chains to said blocks to drive them along said endless path of said guiding rails.

14. Mechanical shears as claimed in claim 13 wherein each block is formed of a shallow central base and of a pair of blade supports upstanding from said base laterally thereof, said supports and base having grooves thereon forming a continuous channel; said blades being received and secured in said channels.

15. Mechanical shears as claimed in claim 13, wherein said third conveyor comprises an endless chain having a series of stem-driving members distributed therealong, each member having, in cross-section, the shape of a right angled triangle with a trailing hypothenuse and a sharp top apex intended to grip said stems to drive them along said passage.

16. Mechanical shears as claimed in claim 15 including a frame supporting said conveyors and means, at the inlet end of said passage, to guide and drive the tree stems to be slashed, said means comprising:

a pair of lower levers, each on one side of said inlet end outwardly of said frame and mounted at one end to said frame for pivotal movement about an axis transverse to said passage, and a motorized driving roller mounted at the free ends of said levers for rotation about an axis parallel to said transverse axis;

a pair of upper levers, each on one side of said inlet end outwardly of said frame, one end of said upper levers being pivotally connected to the roller end of said first levers;

first extensible power means interconnecting said frame and the other ends of said upper levers and capable of moving said upper levers relative to said frame while moving said lower levers along;

a pressure roller between said upper levers, and second extensible power means interconnecting said pressure roller and said upper levers to press said motorized roller against a stem being guided and driven into said passage.

17. Mechanical shears as claimed in claim 16 wherein said first and second extensible power means comprises hydraulic rams.

18. Mechanical shears for slashing tree stems into logs of a predetermined length, said shears comprising: a pair of conveyor assemblies each including an endless track having a forward portion, a return portion and end portions, all defining endless riding surfaces; means mounting said tracks with their forward portions facing one another and longitudinally inclined toward one another whereby to define a tapering passage along which the stems to be slashed are moved, the wide end of said passage being the stem inlet end and the narrow end the outlet end; each assembly including an equal number of shear blocks mounted on said tracks and means driving said blocks thereon at equal speed and spacing them from one another a distance equal to said predetermined length; said shear blocks each having a shear blade projecting laterally outwardly of the respective track and each having roller means for sliding movement on said riding surfaces of said track; said blocks being so located along said tracks that the cutting edge of a shearing blade of one block on one track edgedly faces the cutting edge of a shearing blade of a block on the other track when the blocks ride on the track forward portions, said blades moving toward one another as said blocks are displaced in said passage and shear tree stems fed thereinto.

* * * * *